3,250,622
METHOD OF STIMULATING MILK PRODUCTION IN ANIMALS
James W. Brooks, Milwaukee, Wis., assignor to Pabst Brewing Company, Milwaukee, Wis., a corporation of Delaware
No Drawing. Filed Sept. 1, 1961, Ser. No. 135,445
2 Claims. (Cl. 99—2)

This invention relates to a method of stimulating milk production in milk producing animals and to feed rations for use therein. The method and feed materials of the invention have particular utility in stimulating milk production in dairy cows but are also applicable to other milk producing animals.

It has been recognized heretofore that substances which are useful for stimulation of growth in certain types of animals are not necessarily of any value in stimulating milk production in milk producing animals. Thus a substance which would be added to a feed for beef cattle in order to fatten the cattle would not ordinarily be used in feeding dairy cattle.

In accordance with the present invention it has been found that certain enzymes and combinations of enzymes stimulate milk production in milk producing animals. These enzymes are gumase and combinations of gumase with protease and amylase. Although this finding is applicable to milk producing animals generally, it is especially important with respect to dairy cattle.

In the practical application of the invention it is preferable to administer the enzymes orally to milk producing animals by incorporating them into a feed additive which in turn is uniformly mixed with the animal feed. It is possible to administer the enzymes orally as such, but the amounts involved are extremely small. It is generally preferably to prepare the feed additive with 1% to 99% by weight of a normally solid, free-flowing edible carrier, the remainder consisting essentially of gumase or gumase in combination with amylase and protease. Where gumase alone is used a typical feed additive consists of one part by weight of gumase to twenty-seven parts by weight of calcium carbonate. Where a combination of gumase is used with protease and amylase a typical feed additive consists of approximately 40% by weight of total enzymes and 60% by weight of a malt flour. The malt flour normally contains enzymes such as cytase and diastase but these in themselves do not appear to contribute to the milk stimulating effect in the quantities of the feed additive used in the practice of the invention.

The additive or feed supplement is usually added and uniformly mixed with a basal feed, preferably a complete feed containing the usual feed components for dairy animals, including a cereal grain, preferably corn, and other usual components, such as, hay, alfalfa, and the like. The proportions of the feed additive are sufficient to improve milk stimulation when employed for feeding such animals. The feed additive which is preferred for the purpose of the invention contains 680,000 to 20,400,000 PV units of protease per pound of feed additive, 1,135,000 to 34,050,000 DV units of amylase per pound of feed additive, and 1,000 to 81,600 gumase units per pound of feed additive.

A preferred additive contains 3,405,000 PV units per pound of proteolytic enzyme, 5,675,000 DV units per pound of amylolytic enzyme and 13,620 gumase units per pound, intimately associated with a ground malt carrier in proportions corresponding to about 40% of total enzymes to 60% of the ground malt carrier. This additive is referred to hereinafter as Additive A.

The quantity of the enzymes required to stimulate milk production in milk producing animals is extremely small. Thus, in the use of Additive A in dairy cattle feeds the quantity required to stimulate milk production is within the range of 500 to 4,000 milligrams (0.5 to 4.0 grams) of Additive A oral intake per head per day. Since Additive A contains only 40% enzymes, the total enzyme requirements are 200 to 1600 milligrams of total milk stimulating enzymes per head per day. In terms of the weight percentage of enzymes (without the carrier) based on the weight of the grain component in the feed, the range of proportions is preferably 0.003% to 0.03% and especially good results have been obtained with 0.012% to 0.024%.

The invention will be further illustrated but is not limited by the following examples in which the quantities are given in parts by weight unless otherwise indicated and the tests reported are made in different areas and territories indicated at the beginning of each example.

*Example I*

*Florida.*—This test involved 196 head of milking cows in a commercial dry lot dairy operation. The test was conducted over a 41-day period between August 26 and October 5, of the test year. Crossbred cows of Brown Swiss, Guernsey, Jersey and Holstein breeding were employed in the test. Additive A was added to a manufactured complete feed at a level to supply 3 grams of enzyme supplement per head per day.

Results of the test are shown in the following table:

| | September | | | April through August | | |
|---|---|---|---|---|---|---|
| | Two Years Before Test | Preceding Year | Test Year | Two Years Before Test | Preceding Year | Test Year |
| Average daily milk production per cow, pounds | 24.4 | 25.9 | 27.0 | 24.4 | 26.9 | 25.9 |
| Average daily feed per cow, pounds | | | 21.5 | 26.1 | 25.1 | 22.4 |

The use of Additive A in the ration of these cows resulted in an improvement of 1.1 pounds of milk per head per day with a feed savings of 0.9 pound, when compared with the results of a 5-month period without Additive A in the ration. This is of particular significance when one considers that September normally is the poorest milk production month in the Florida area.

*Example II*

*Canada.*—In this test, 10 pairs of cows from an outstanding Jersey herd were selected on the basis of calving dates and level of milk production. One cow in each pair was fed Additive A (3 grams per head per day) and the other a control ration for 54 days.

The results are given in the following table:

| Group | Average Daily Milk Production | | Drop in Milk Production, Percent | Average Daily Grain Intake, Pounds |
|---|---|---|---|---|
| | 60-Day Pre-Test, Pounds | 54-Day Test, Pounds | | |
| Control | 31.5 | 28.7 | 8.9 | 12.2 |
| Additive A | 30.8 | 28.7 | 6.8 | 11.6 |

During the 54-day test the Additive A group held its milk production better than the controls on 0.6 pound less feed. This benefit over a 100-day period would result in 2.1% more milk and a 60 pound savings in feed per cow.

*Example III*

*Wisconsin.*—These are observations on a test conducted with a high producing Holstein heard.

A group of 8 cows in early lactation (80 days) was split into two groups on the basis of milk production (4% fat-corrected milk) and calving dates. One group received the control ration of rolled oats, ground snapped corn, dried brewer's grains, soybean oil meal, wheat bran, steamed bone meal and trace mineralized salt; another group received in addition 3 grams of Additive A per head per day. All cows were given a free choice supply of hay.

The results of 89 days on test are summarized in the following table:

| Group | Average Daily Milk Production[1] | | Drop in Milk Production, Percent | Average Daily Grain Intake, Pounds |
|---|---|---|---|---|
| | 30-Day Pre-Test, Pounds | 89-Day Test, Pounds | | |
| Control | 71.7 | 59.5 | 17.0 | 21 |
| Additive | 70.2 | 59.8 | 14.8 | 20 |

[1] Calculated on a 4% fat-corrected milk basis.

Additive A when added to the basal ration resulted in a 2.2% improvement in preventing the drop in milk production during the 89-day test. There was also a feed savings of 89 pounds per cow.

*Example IV*

*California.*—This test was conducted in the Los Angeles milk shed. A group of 504 cows was split into 2 groups of control cows (84 cows each) and 4 groups of treated cows (84 cows each). All cows were fed approximately 16 pounds of a 16% protein supplement and allowed approximately 32 pounds of alfalfa hay per head per day. Additive A was added to the ration of the treated cows to give an average daily intake of 3 grams per head per day.

The results of 114 days on test are summarized in the following table:

| | Milk Production (Lbs.)/84 Cows/Day [1] | |
|---|---|---|
| | Control | Additive A |
| Pre-test | 3,857.5 | 3864.1 |
| 51 days | [2] 3,634.0(5.8) | 3,716.6(3.8) |
| 85 dyas | 3,534.8(8.4) | 3,616.9(6.4) |
| 114 days | 3,761.7(2.5) | 3,835.7(0.7) |
| Average | 3,636.9(5.7) | 3,717.2(3.8) |

[1] Calculated on a 4% fat-corrected milk basis.
[2] The figures in parenthesis represent the drop in milk production expressed as a percentage of the pre-test production.

The inclusion of 3 grams of Additive A in the daily ration of milking cows resulted in the production of 1.9% more milk and 1.5% more butterfat over the 114-day period.

From reported tests including a total of 728 head of cows on tests for an average of 92 days, the results have shown Additive A to be effective in improving or maintaining milk yield (average 2%) and increasing the efficiency of grain conversion to milk (average 5%). It will be recognized that these results are very important, especially for dairy farmers. Assuming a herd of 100 cows is producing on the average of 46 pounds of milk daily and consuming 15 pounds per day of a 16% protein supplement, cows eating the same ration supplemented with Additive A would be expected to produce 2% more milk on 5% less feed. This would mean 92 pounds more milk per day per 100 cows. The increase in milk production more than pays for the cost of the enzyme supplement and yields a profit to the farmer.

The invention is hereby claimed as follows:

1. A method of stimulating milk production in dairy cattle which comprises orally administering to dairy cattle 200 to 1600 milligrams per head per day of an enzyme from the group consisting consisting of gumase and combinations of gumase, protease and amylase on a malt carrier, there being approximately 40% by weight of said enzyme combination and 60% by weight of said carrier in said enzyme component, the quantity of said enzymes corresponding to 1,000 to 81,600 gumase units, 680,000 to 20,400,000 PV units of protease, and 1,135,000 to 34,050,000 DV units of amylase per pound of said enzyme component.

2. A method of stimulating milk production in dairy cattle which comprises orally administering to dairy cattle 200 to 1600 milligrams per head per day of a milk production stimulating amount of enzyme component from the group consisting of gumase and combinations of gumase, protease and amylase together with a grain component, the quantity of enzymes per pound of said enzyme component corresponding to 1000 to 81,600 gumase units, 680,000 to 20,400,000 PV units of protease and 1,135,000 to 34,050 DV units of amylase, and said enzyme component corresponding to 0.003% to 0.03% by weight of said grain component.

References Cited by the Examiner

UNITED STATES PATENTS

| 2,906,621 | 9/1959 | Catron | 99—2 |
| 2,988,448 | 6/1961 | Hollenbeck | 99—2 |
| 2,988,499 | 6/1961 | Hollenbeck | 99—2 |

OTHER REFERENCES

Feedstuffs, September 6, 1958, page 20.

A. LOUIS MONACELL, *Primary Examiner.*

ABRAHAM H. WINKELSTEIN, *Examiner.*